July 17, 1928.

J. H. HODGEN

BACK FILLER FOR DITCHES

Filed May 4, 1927

1,677,342

Inventor
James H. Hodgen
by Hazard and Miller
Attorneys

Patented July 17, 1928.

1,677,342

UNITED STATES PATENT OFFICE.

JAMES H. HODGEN, OF LOS ANGELES, CALIFORNIA.

BACK FILLER FOR DITCHES.

Application filed May 4, 1927. Serial No. 188,706.

This invention relates to back fillers for ditches, and more particularly to a back filler that may be constructed upon a motor driven vehicle of conventional type such as a tractor.

An object of this invention is to provide a device supported upon any suitable vehicle, and wherein there is a screw conveyor that will engage a pile of dirt adjacent a ditch to throw the dirt into the ditch as the filler advances upon the pile.

A further object of this invention is to provide a device which is strong and durable in its construction, inexpensive to manufacture, is unlikely to get out of order, and is well adapted to perform the services required of it.

With these and many other objects in view which will more readily appear as the nature of the invention is better understood, the same consists in the novel construction, combination and arrangement of parts, which will hereinafter be more fully described, illustrated and claimed.

The essential features of the invention involved in the carrying out of the objects indicated are susceptible to modification; but a preferred embodiment of the invention is shown in the accompanying drawings, in which.

Figure 1:
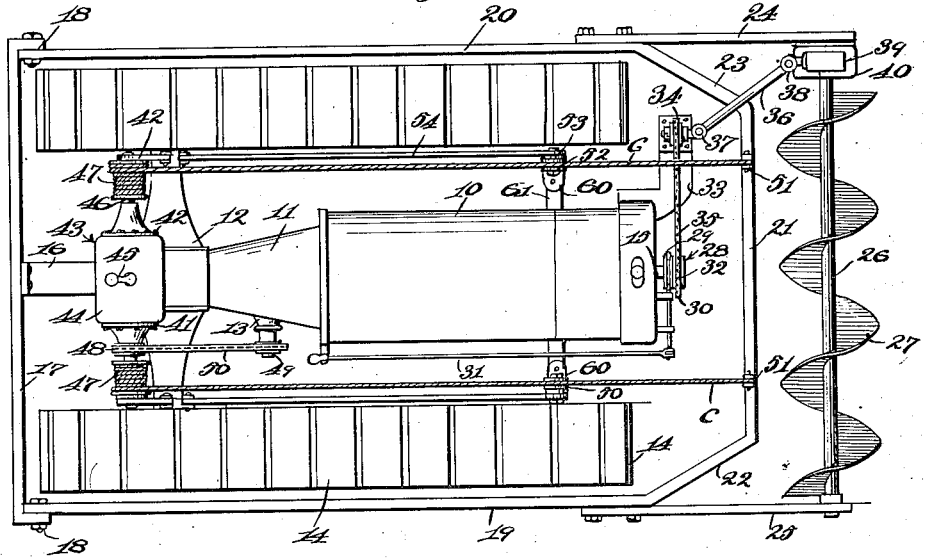
Figure 1 is a top plan view of the device in assembled relation.

The device involves in its present embodiment, a tractor having a head 10, a transmission 11, differential 12, power take-off 13, caterpillar drive 14 and crank shaft 15.

Figure 2:
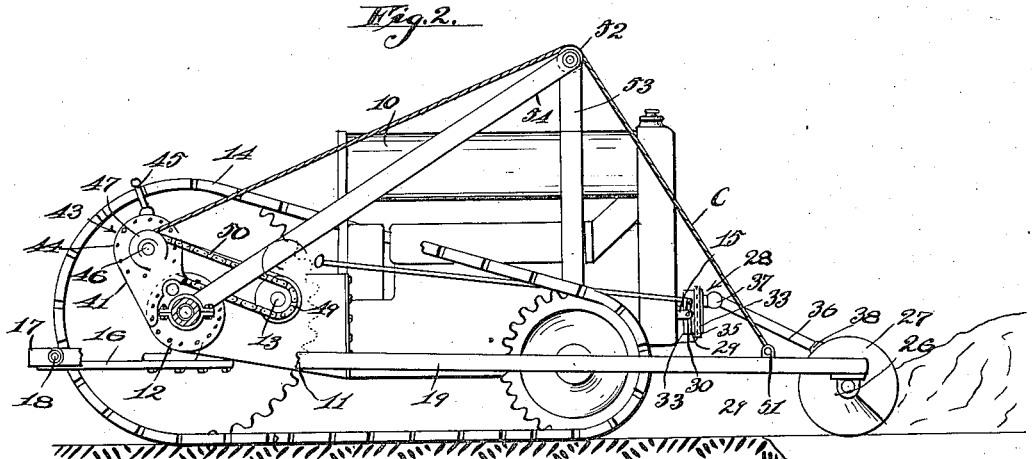
Fig. 2 is a side view showing the device in operative engagement with the dirt to fill in the ditch.
Figure 3:
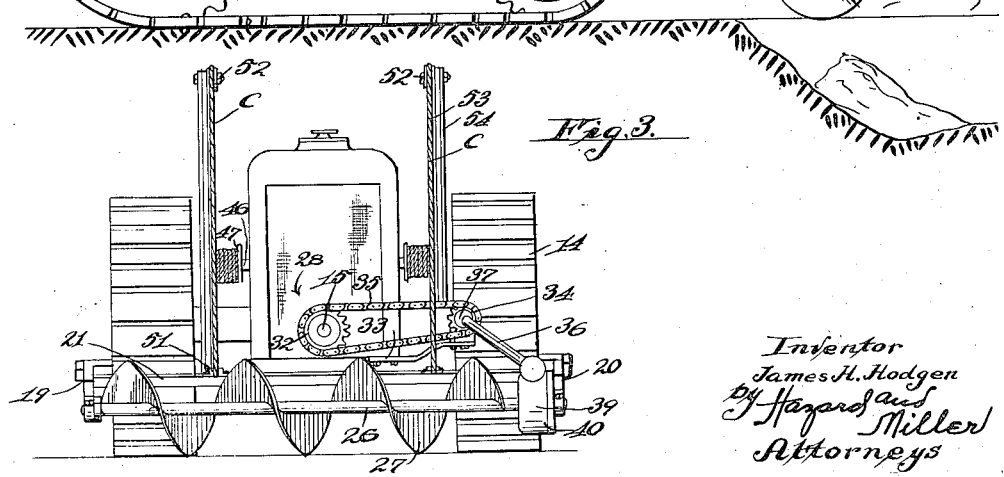
Fig. 3 is a front elevation of the device.

The formation of the above mentioned parts is merely conventional, and no claim is made as to the novelty of the arrangement of these parts. The novelty of this invention lies however, in the built-up construction associated with these parts, which built-up construction co-operates to form my improved back filler for ditches. A heavy plate 16 is securely attached to the lower side of the differential housing, and a crossbar 17 is riveted or otherwise attached to the outer end of this plate. Pivoted to the cross-bars as at 18, are a pair of side bars 19 and 20 respectively, which side bars are joined together at their forward ends by a cross-bar 21 having inclined portions 22 and 23. Extensions 24 and 25 are secured to the side bars 19; and a shaft 26 having a screw conveyor 27 mounted thereon, is mounted for rotation between the outer ends of the extensions 24 and 25. A clutch assembly 28 having friction discs 29 and 30, is mounted on the end of the crank shaft 15, and a sprocket-wheel 32 comprises a part of this assembly. This clutch assembly is provided with a clutch lever 31. A plate 33 is attached to the head and has a similar sprocket-wheel 34 mounted thereon in any suitable manner. A sprocket chain 35 connects the sprocket-wheel 32 to the sprocket-wheel 34. A drive shaft 36, having at both ends universal joints 37 and 38 respectively, extends from the sprocket-wheel 34 to a worm transmission 39, the housing 40 of which is mounted on the extension 24. This transmission serves to rotate the screw conveyor 27 from the end of the crank shaft 15 as a source of power. The differential housing has a pair of plates 41 and 42 attached thereto, and an auxiliary transmission designated as an entirety at 43, is mounted on these plates. This transmission comprises a housing 44, operating lever 45 and a shaft 46. Drums 47 are mounted on the shaft. A sprocket-wheel 48 is also mounted on one end of the shaft, and a sprocket-wheel 49 on the power take-off 13 serves to drive the shaft 46 by means of a suitable sprocket chain 50. Brackets 51 are attached to the cross-bar 21, and cables C having their ends fastened to these brackets, extend rearwardly over pulleys 52, which are mounted on supports 53 and 54. These cables C extend to the drums 47 as clearly shown in Figures 1 and 2. The supports 53 and 54 are attached at their lower ends, to brackets 60 on the front wheel axle 61 and to the rear axle housing respectively, and thus it will be seen that the frame work provided by the side bars 20, cross-bar 21, extensions 24 and 25 may be bodily elevated, since the same is pivoted at 18 to the cross-bar 17.

In actual operation, the tractor is free to travel in the usual manner, and the screw conveyor 27 may be elevated and held in such position by the cables C. When it is desired to fill in a ditch, the device is brought alongside of the same, and by operating the transmission 43 and the power take-off 13, the screw conveyor 27 may be lowered to the ground. The clutch 31 is then thrown in and the screw conveyor is rotated.

The operator may then drive the tractor forwardly at a slow speed, and as the screw conveyor rotates, dirt will be forced into the ditch. Heavy objects such as boulders, rocks or the like, may be thrown into the ditch by hand, but my back filler for ditches will ordinarily operate on all manner of loose material, and will leave a clean path behind the same.

The device is extremely simple in its construction and is inexpensive to manufacture, and one operator may effectively attend to the machine in operation.

From the foregoing, it is thought that the construction, use and many advantages of the herein-described back filler for ditches, will be readily apparent without further description, and it will also be understood that changes in the form, proportion, and minor details of construction may be resorted to without departing from the spirit of the invention or sacrificing any of the advantages thereof.

What I claim by this invention and desire to secure by Letters Patent, is:

1. The combination with a tractor having a power take-off crank shaft and differential housing, of a cross-bar attached to said differential housing, a frame pivoted to said cross-bar, an auxiliary transmission assembly mounted on said differential housing, a drum comprising an element of said assembly, a cable attached to said frame and extending around said drum, and a screw conveyor mounted for rotation on said frame, and means for rotating said drum from said power take-off.

2. The combination with a tractor having a power take-off, differential housing and crank shaft, of a frame operatively pivoted to said differential housing, a screw conveyor pivoted in said frame, a sprocket-wheel revolubly mounted on said tractor, a sprocket-wheel mounted on said crank shaft, a sprocket chain connecting said sprockets, a worm transmission mounted on said frame operatively connected to said screw conveyor, a drive shaft operatively connecting said first mentioned sprocket-wheel and worm transmission, whereby power derived from said crank shaft may drive said screw conveyor, and means for lowering and raising said frame.

3. The combination with a tractor having a power take-off, crank shaft and differential housing, of a bracket mounted on said differential housing, a cross-bar attached to said bracket, a frame pivoted to said bracket and surrounding said tractor, extension arms on said frame, a shaft mounted between said extension arms for rotation, said shaft having a screw conveyor thereon, a driving connection between said crank shaft and screw conveyor to rotate the same, an auxiliary transmission mounted on said differential housing, a driving connection between said power take-off and said auxiliary transmission, a drum rotatable by said auxiliary transmission, a cable on said drum, said cable being attached to the forward end of said frame to raise and lower the same as and for the purpose specified.

4. The combination with a tractor having a power take-off and crank shaft, of a cross-bar operatively attached to said tractor, a frame surrounding said tractor pivotally attached to said cross-bar, an auxiliay transmission attached to said tractor, said transmission including a shaft having a drum thereon, means for rotating said drum comprising an operative connection between said power take-off and said transmission, a cable on said drum, a support on said tractor, a pulley on said support, said cable extending over said pulley and attached to said frame, whereby the same may be elevated, extension arms on said frame, a screw conveyor mounted for rotation between said extension arms, and means operable by said crank shaft for rotating said screw conveyor.

In testimony whereof I have signed my name to this specification.

J. H. HODGEN.